United States Patent
Tanahashi et al.

[11] Patent Number: 6,001,447
[45] Date of Patent: Dec. 14, 1999

[54] LONGITUDINAL MAGNETIC RECORDING MEDIA AND MAGNETIC STORAGE APPARATUS USING THE SAME

[75] Inventors: Kiwamu Tanahashi, Fujisawa; Yuzuru Hosoe, Hino; Ichiro Tamai; Tetsuya Kanbe, both of Yokohama; Tomoo Yamamoto, Nagaoka; Masukazu Igarashi, Kawagoe; Yoshio Takahashi, Kunitachi, all of Japan

[73] Assignee: Hitachi, Ltd., Tokyo, Japan

[21] Appl. No.: 09/004,318

[22] Filed: Jan. 8, 1998

[30] Foreign Application Priority Data

Feb. 21, 1997 [JP] Japan .................... 9-037389

[51] Int. Cl.⁶ .................................... G11B 5/66
[52] U.S. Cl. .................. 428/65.3; 428/694 TS; 428/694 TP; 428/694 TM; 428/336; 428/900
[58] Field of Search ............. 428/65.3, 694 TS, 428/694 TP, 694 TM, 900, 336

[56] References Cited

U.S. PATENT DOCUMENTS

| | | | |
|---|---|---|---|
| 4,652,499 | 3/1987 | Howard | 428/641 |
| 5,693,426 | 12/1997 | Lee | 428/611 |
| 5,800,931 | 9/1998 | Lee | 428/611 |

FOREIGN PATENT DOCUMENTS

| | | |
|---|---|---|
| 140 513 A1 | 5/1985 | European Pat. Off. . |
| 62-257618 | 11/1987 | Japan . |
| 63-197018 | 8/1988 | Japan . |
| 8-77543 | 3/1996 | Japan . |

OTHER PUBLICATIONS

E.P. Wohlfarth, "The Coefficient of Magnetic Viscosity", J. Phys. F: Met. Phys., vol. 14, 1984, pp. L155–L159.
K. Yamanaka et al, "Magnetic Viscosity of Oriented Barium Ferrite Media", Journal of Magnetism and Magnetic Materials, vol. 127, 1993, pp. 233–240.

Primary Examiner—Leszek Kiliman
Attorney, Agent, or Firm—Beall Law Offices

[57] ABSTRACT

The magnetic storage apparatus has a high reliability at a recording density of 2 gigabits or more per square inch. The longitudinal recording media necessary to realize the apparatus has a low media noise and is immune from the influence of thermal fluctuations. The magnetic storage apparatus has a longitudinal magnetic recording media including a magnetic layer which is formed on a substrate via a multi-layered underlayer; a driver for driving the recording media in a recording direction; a magnetic head including a recording section and a read-back section; a driver for moving the magnetic head relatively with respect to the longitudinal magnetic recording media; and a read/write signal processor for processing input signals to the magnetic head and output signal read-back therefrom. The read-back section of the magnetic head includes a magnetoresistive head. One layer of the multi-layered underlayer in the longitudinal magnetic recording media which is in contact with the magnetic layer has a substantially hexagonal close-packed (hcp) structure and has crystal grains whose c-axes are substantially parallel with the substrate plane.

27 Claims, 7 Drawing Sheets

LONGITUDINAL MAGNETIC RECORDING MEDIA AND MAGNETIC STORAGE APPARATUS USING THE SAME

FIELD OF THE INVENTION

The present invention relates to a longitudinal magnetic recording media and a magnetic storage apparatus. In particular, the present invention relates to a magnetic storage apparatus having a recording density exceeding 2 gigabits per square inch and a longitudinal magnetic recording media used by the magnetic storage apparatus for realizing this recording density.

BACKGROUND OF THE INVENTION

With the advancement of high performance computers, the quantity of information to be processed including image data is continuously increasing. Accordingly, a larger storage capacity is required for a magnetic recording disk drive which is employed as an external storage device. Presently, a storage capacity as large as several hundred megabits per square inch has been realized. A magnetic head, used in such a high density magnetic recording disk drive, is an integrated head having a separately provided electromagnetic induction head for use as a recording head and a magnetoresistive head for use as a read-back head. The magnetoresistive head has improved read-back sensitivity as compared with the conventional electromagnetic inductive head and has an advantage in that an adequate read output is ensured even if its recording bit becomes smaller and its leakage flux is reduced. Furthermore, a giant magnetoresistive effect head of a spin valve type having even more improved read-back sensitivity is being developed.

Magnetic recording media currently in use include a Co alloy magnetic layer such as CoNiCr, CoCrTa, CoCrPt, or the like, and a Cr underlayer which controls crystallographic orientation of the magnetic layer. The Co alloy magnetic layer has a hexagonal close-packed (hcp) structure having its c-axis as an axis-of-easy magnetization. When the Co alloy magnetic layer is used as a longitudinal magnetic recording media, it is preferable for its c-axis to be oriented in-plane, also referred to as horizontally. Therefore, a method for orientating the c-axis in the direction within the plane is used, whereby a Cr underlayer having a body-centered cubic (bcc) structure is formed on a substrate, then a Co alloy magnetic layer is formed epitaxially thereon so as to orientate the c-axis in-plane.

In the case where a CoCrPt alloy having a large lattice constant is used as a magnetic layer, as disclosed in JP-A Laid-Open Nos. 62-257618 and 63-197018, a lattice spacing is increased by the addition of Ti or V to Cr to improve lattice matching with the magnetic layer so as to more effectively orientate the c-axis in-plane.

When the magnetoresistive head is used during read-back, since noise accompanies the signal being reproduced from the longitudinal magnetic recording media at high sensitivity, significantly improved noise reduction is required for the longitudinal magnetic recording media. The noise is mainly caused from magnetization distortion in a magnetization transition region between recording bits. Therefore, narrowing of this region will lead to a reduction of noise. In order to accomplish this, it is effective to make magnetic crystal grains finer as well as weakening the interaction between respective grains, thereby reducing the size of magnetization reversal. As described above, since there is an epitaxial relationship between the magnetic layer and its underlayer, finer magnetic crystal grains can be obtained by forming crystal grains of the underlayer of a smaller size. In order to form grains of the underlayer of a smaller size, various methods are being studied, but no suitable solution had been discovered until the present invention.

SUMMARY OF THE INVENTION

The problems with the prior art method have been studied by the present inventors. Some of these problems are set forth below. First of all, in the prior art, it is difficult to fabricate a magnetic layer whose thickness is reduced while increasing recording density and which maintains a preferred crystallographic orientation while still having an excellent crystallization film. Furthermore, there is another problem in that a satisfactory epitaxial relationship is difficult to obtain between the underlayer and the magnetic layer. Also, magnetization becomes thermally unstable due to the provision of magnetic crystal grains in smaller sizes, thereby attenuating recorded signals over time.

The present invention solves the above-mentioned problems and other problems associated with the prior art. An object of the present invention is to provide a magnetic storage apparatus having a highly reliable operation at a recording density of 2 gigabits or more per square inch. It is also an object of the present invention to provide longitudinal magnetic recording media for use in a magnetic storage apparatus which features low noise and is not susceptible to the influence of thermal fluctuation of the media.

The above-mentioned objects of the present invention are accomplished by providing a magnetic storage apparatus which includes a longitudinal magnetic recording media having a magnetic layer formed on a substrate via a multi-layered underlayer; a driver for driving the same in the direction of recording; a magnetic head including a recording section and a read-back section; a means for causing the magnetic head to move relatively with respect to the longitudinal magnetic recording media; and a read/write signal processor used as a means for processing a signal input to the magnetic head and an output signal read-back from the magnetic head.

The readout section of the magnetic head includes a magnetoresistive head. A fluctuation field of magnetic viscosity at 25° C. in a magnetic field, having a field strength equal to a remanence coercivity or coercive force of the longitudinal magnetic recording media, is set at 45 Oe or more. One layer of the multi-layered underlayer which is in contact with the magnetic layer has a substantially hexagonal close-packed structure. A c-axis of the layer of the multi-layered underlayer which is in contact with the magnetic layer is orientated approximately in parallel with the substrate.

The magnetic layer of the longitudinal magnetic recording media can be formed from an alloy including Co as its main component such as CoCrNi, CoCrTa, CoCrPt, CoCrNiPt, CoCrPtTa, CoCrPtTi, etc. In particular, a Co alloy with the addition of Pt is suitable for high density recording applications since it has a high anisotropy field and it is easy to obtain a high coercive force. In order to use this alloy as a longitudinal magnetic recording media, it is necessary that the c-axis of the Co alloy magnetic layer is oriented in the direction within the plane of the magnetic layer.

According to the present invention, a multi-layered underlayer is provided beneath the magnetic layer. A material having a hexagonal close-packed (hcp) structure is selected as a layer within the multi-layered underlayer which is in contact with the magnetic layer, and the c-axis of this layer is orientated substantially parallel to the plane of this layer.

The present inventors have recognized that the prior art longitudinal magnetic recording media, obtained by epitaxially growing a Co alloy magnetic layer having an hcp structure on a Cr or Cr alloy underlayer, has a problem regarding its crystalline structure in that a portion of its magnetic layer which has been grown at an initial stage includes excessively finer crystal grains. When the thickness of the magnetic layer is decreased accordingly, another problem occurs in that its coercive force and coercive squareness are lowered, as shown by way of example in FIG. 1.

Additionally, as shown by way of example in FIG. 6, there is a problem in that a read output attenuates according to the time elapsed after writing. Decreases in the read output described above were more significant when a linear recording density of a recorded signal was higher, and when the fluctuation field Hf of the recording media was greater. Here, fluctuation field Hf refers to a quantity of easy thermal fluctuation in magnetization. This has been described by E. P. Wohlfarth in an article presented at a meeting of the Magnetism Group of the Institute of Physics in London on Mar. 26, 1984, entitled "The Coefficient of Magentic Viscosity", Journal of Physics F: Metal Physics, vol.14, pp.L155–L159 (1984). A detailed description of the measurement conditions is provided in an article by K. Yamanaka et al, entitled "Magnetic Viscosity of Oriented Barium Ferrite Media" and published in the Journal of Magnetism and Magnetic Materials, vol.127, pp.233–240 (1993). Both of these publications are hereby incorporated by reference.

The principles involved in the measurement of the fluctuation field Hf will now be described. In most magnetic substances, when a new magnetic field is applied, the substances' magnetization I(t) will change in a logarithmic function of equation (1) relative to logarithm ln t as follows.

$$I(t) = \text{Constant} + S \cdot \ln t \tag{1}$$

In equation (1), I(t) is a magnetic moment per unit volume, and t is the time that has elapsed after application of the new magnetic field. S is referred to as a viscosity coefficient and can be expressed by equation (2) as a product of irreversible magnetic susceptibility $\chi_{irr}$ and a fluctuation field Hf.

$$S = \chi_{irr} \cdot Hf \tag{2}$$

Therefore, fluctuation field Hf can be determined by S and $\chi_{irr}$ obtained from experiments.

As described in JP-A Laid-Open No.8-77543, when the field strength is equal to coercive force Hc or remanence coercivity Hr, its fluctuation field Hf can also be obtained from a magnetic field application time dependency of Hc or Hr. In most cases, the coercive force or remanence coercivity tends to decrease with time according to equation (3).

$$Hc \text{ (or } Hr) = \text{Constant} - A \cdot \ln t \tag{3}$$

In equation (3), A is a proportional coefficient. In the longitudinal magnetic recording media according to the present invention and described in this specification, the relationship of equation (3) was confirmed to hold. When equation (3) holds, it is known that A assumes almost the same value as that of fluctuation field Hf under the condition that the field strength equals the coercive force or remanence coercivity. Hence, the value of A is used as fluctuation field Hf in this description of the present invention.

As a result of the inventors' studies of the relationship between fluctuation field Hf and media noise Nd, it was discovered that in order to accomplish a (planar) recording density of 2 gigabits or more per square inch, it is necessary for the value of Hf to be at least 40 Oe. Further, it is more preferable to have a value of at least 45 Oe for Hf to ensure an adequate media S/N ratio. However, as indicated in FIG. 10, when a value of Hf becomes greater than 40 Oe, a phenomenon occurs that a read output attenuates with the passage of time. In a media having a magnetic layer whose thickness is further reduced by increasing its Hf, its attenuation increased substantially. Furthermore, since its attenuation increases with increasing linear recording density, it is an even greater problem in the case of a high density magnetic recording.

As a result of extensive studies of various methods to solve these problems by the present inventors, it was discovered that by providing an hcp structure, that is the same as that of a magnetic layer, as one layer in a multi-layered underlayer, which is in contact with the magnetic layer (this one layer of the underlayer is hereinafter referred to as the "hcp underlayer"), a crystalline structure in part of the magnetic layer which was grown in an initial stage improves substantially. Thus, it is possible to yield a magnetic layer that is capable of minimizing both the deterioration of magnetic properties (in particular, decrease of coercivity squareness) resulting from reduction of thickness of the magnetic layer and attenuation of the read output. From a viewpoint of lattice matching with a Co alloy magnetic layer and a minimized influence on magnetization of the magnetic layer, the hcp underlayer should preferably have Co and Cr as its main components, with the density of Cr being 26–50 at %. When Cr density drops below 26 at %, magnetization of the hcp underlayer is allowed to affect the magnetic properties of the magnetic layer. When Cr density exceeds 50 at %, it becomes difficult for the hcp structure to achieve a good crystalline structure.

By the addition of an appropriate amount of Mo, Ta, Ti, W, or the like, as components of the hcp underlayer, magnetization of the hcp underlayer can be reduced and grain size dispersion can be minimized as well. Mo, Ta and W have high melting points and are effective in reducing the media noise by reducing a mean grain size of the hcp underlayer. Furthermore, Ta and Ti have larger atomic radii and the expanding of a crystal lattice is more effective for improving lattice matching with the magnetic layer which has a high Pt density.

The thickness of the hcp underlayer is preferably 5–20 nm from the view point of improving the crystalline structure of the magnetic layer and preventing an increase of grain sizes. When the film thickness of hcp underlayer becomes less than 5 nm, since the crystalline structure of the initially grown part of the magnetic layer does not greatly improve, there is a decrease in the suppression of the deterioration of magnetic properties. On the other hand, when the film thickness of the hcp underlayer becomes greater than 20 nm, the grain size of the magnetic layer becomes larger and media noise increases.

According to the present invention, it is necessary that the c-axis of the hcp underlayer in contact with the magnetic layer is oriented in the direction within the plane thereof. Such a crystallographic orientation can be achieved by forming the hcp underlayer on an underlayer which has a bcc structure and a (100) plane which is parallel with its surface layer. As materials of such an underlayer having a bcc structure, it is preferable to select from Cr and Cr alloys such as CrTi, CrV, CrMo, CrTa and the like. When Cr alloys are used, there occurs such a problem that depending on the added amounts of Ti, V, Mo, and Ta, a preferred crystallographic orientation becomes difficult to obtain. This can be solved by providing a two-layered bcc underlayer which includes a first bcc underlayer which contains Cr, and a second bcc underlayer which contains a Cr alloy and is epitaxially grown on the first bcc underlayer, thereby accomplishing a preferred crystallographic orientation.

The substrate needs to have an excellent surface smoothness and can be one that has NiP formed on its surface. Suitable substrates include Al—Mg, glass, SiO2, SiC, carbon, and the like. A protection layer for protecting the magnetic layer can be provided by forming carbon of 10–30 nm thickness, then forming a lubricating layer of perfluoroalkylpolyether, or the like, of 2–20 nm thickness, thereby ensuring a highly reliable longitudinal magnetic recording media. Furthermore, by using hydrogenated carbon or silicon carbide as the protection material, endurance of slidability and corrosion resistance can be improved substantially.

Many reports have been published on prior art magnetic recording media which have a two-layered or multi-layered hcp magnetic layer. However, they are essentially different from the present invention as follows. In the prior art, the magnetic layer which records signals is separated into layers, while in the present invention the hcp layer is used as the underlayer of the magnetic layer, and the hcp layer does not serve as a recording layer since magnetization of its hcp underlayer is lower than 15% of the magnetic layer. Advantageously, it is preferable for the product $t(hcp) \cdot Bs$ (hcp) of hcp underlayer thickness+(hcp) and a saturated flux density Bs(hcp) to be less than 20% of a product $t \cdot Bs$ of a film thickness t of the magnetic layer and saturated flux density Bs. When the product $t(hcp) \cdot Bs(hcp)$ becomes greater than that set forth above, a base line shift is caused to appear in an output waveform from the magnetoresistive head, thereby increasing read-back noise.

Furthermore, there is a case in which a non-magnetic CoCr underlayer is applied to a perpendicular magnetic recording medium as disclosed in JP-A Laid-Open No.55-122232. However, there exists a major difference between this prior art and the present invention in that the c-axis of this prior art CoCr underlayer is perpendicular to the plane of the layer. Thereby, the c-axis, which is an axis of easy magnetization, of a magnetic layer to be formed thereon also becomes perpendicular to the plane of the layer, thereby preventing its use as a longitudinal magnetic recording media in which information is recorded by orientating magnetization in the direction within the plane thereof. Furthermore, the problem of record bit attenuation in the longitudinal recording media appears in a high density recording region in which a demagnetizing field from magnetization in bit boundary becomes greater. In contrast, in perpendicular magnetic recording media, since the demagnetizing field becomes smaller in this region, its recording magnetization becomes stabilized.

The problem of record bit attenuation in the perpendicular magnetic recording media appears in the low recording density region. The attenuation of record bits in this region is caused by the occurrence of reverse magnetic domains, which cannot be solved merely by increasing the volume of magnetic crystal grains. As described above, the longitudinal recording media addressed in the present invention and the prior art perpendicular magnetic recording media are principally different from each other in their mechanisms of record bit attenuation, and therefore the advantages and effect of the present invention cannot be attained simply by use of the prior art underlayer.

A magnetoresistive sensor of a read-back magnetoresistive head for use in the magnetic storage apparatus of the present invention is formed between two shield layers made of soft magnetic material which are separated from each other by a gap which is less than 0.35 $\mu$m. It is not desirable for this gap between these two shield layers to increase larger than 0.35 $\mu$m, since resolution will decrease. As magnetic properties of the longitudinal magnetic recording media preferable for reducing media noise, it is preferable to have a value of product Br×t set at 10 G –130 G $\mu$m, where t is a thickness of the magnetic layer and Br is a residual magnetic flux density measured by applying a magnetic field in the direction of movement of the magnetic head relative to the longitudinal magnetic recording media at the time of recording, and further to have a value of coercive force Hc set at 2 kOe or more, as measured by applying a magnetic field in the same direction as that described above. Then, by such arrangement, its magnetization transition region will become narrower, thereby reducing the media noise.

When a value of Br×t is decreased below 10 G $\mu$m, adequate read output cannot be obtained, and when it is increased above 130 G $\mu$m, resolution will decrease. When the coercive force becomes smaller than 2 kOe, disadvantageously, a large decrease in read output occurs at a high recording density greater than 200KFCI. Furthermore, the above-mentioned magnetoresistive head includes a plurality of conductive magnetic layers which produce a large resistive change due to relative changes in their magnetization directions effected by an external magnetic field. Also included is a magnetoresistive sensor including a conductive non-magnetic layer disposed between these conducting magnetic layers so as to substantially enhance read-back signals, thereby accomplishing a magnetic storage apparatus which is highly reliable and has a high recording density of 3 gigabits or more per square inch.

These and other objects, features and advantages of the present invention will become more apparent in view of the following detailed description of the preferred embodiments in connection with the attached drawings.

DETAILED DESCRIPTION OF THE PREFERRED EMBODIMENTS

The preferred embodiments of the present invention will now be described in conjunction with the appended drawings.

Figure 2A:
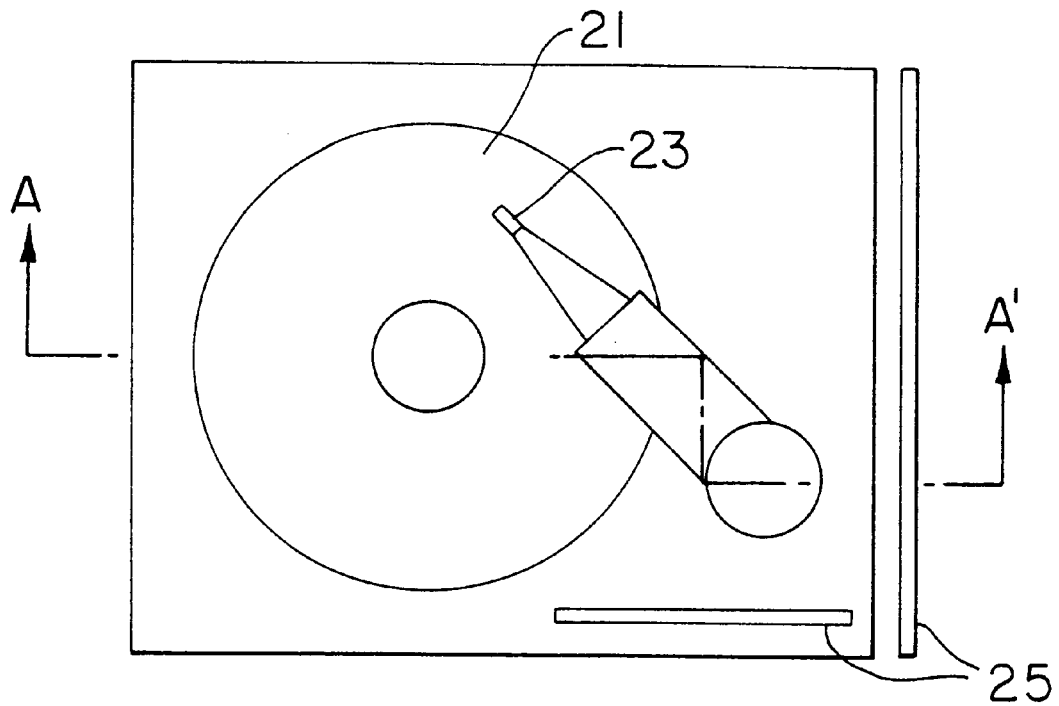
FIGS. 2(*a*) and 2(*b*) are schematic plan views of a magnetic storage apparatus of one embodiment of the invention, where FIG. 2(*b*) is a cross-section along the line A—A in FIG. 2(*a*).
Figure 2B:
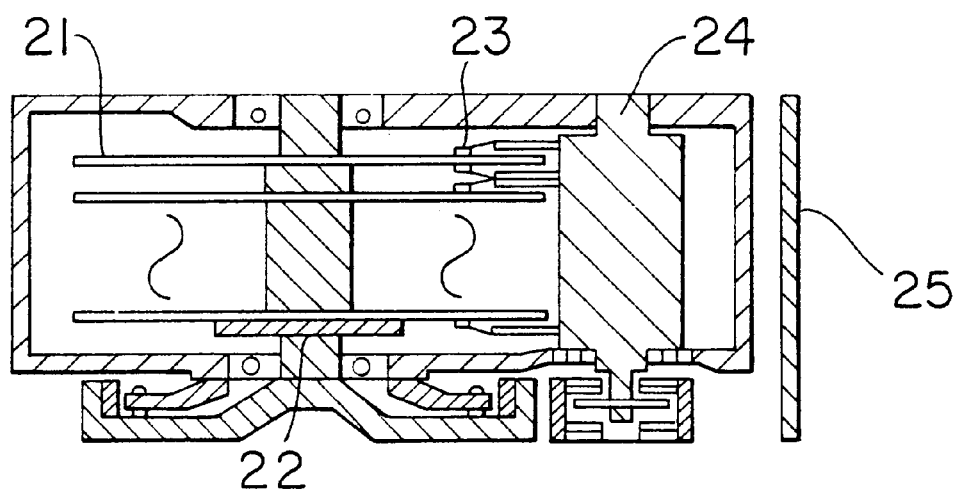

FIG. 2(a) shows a schematic plan view of a magnetic storage apparatus of one embodiment of the present invention, and FIG. 2(b) shows a schematic cross-sectional view of the same along the line A—A. This magnetic storage apparatus includes a longitudinal magnetic recording media 21; a driver 22 for rotating the recording media; a magnetic head 23 and its driver 24; and a read/write signal processor 25.

Figure 3:
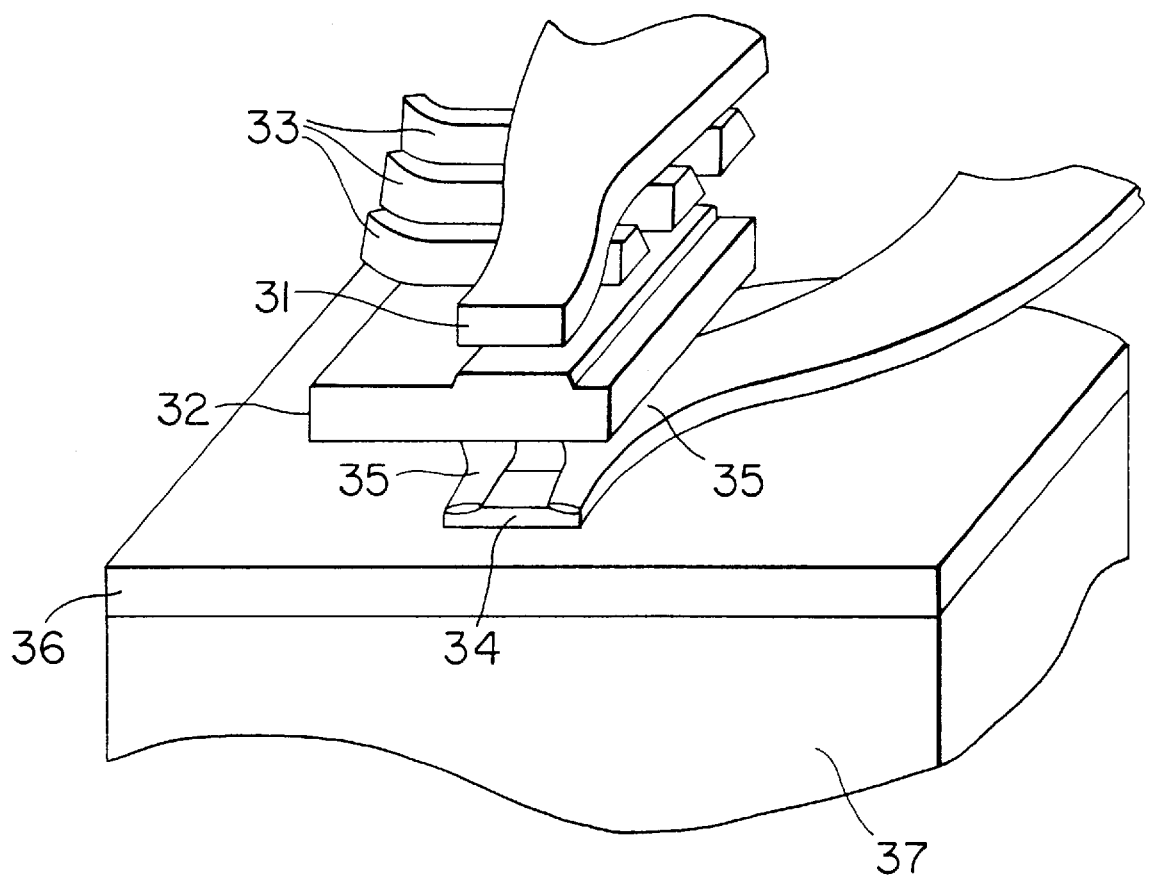
FIG. 3 is a schematic perspective view indicating a cross-sectional structure of a magnetic head for use in the magnetic storage apparatus of the invention.

FIG. 3 is a schematic diagram of the structure of a magnetic head for use in this magnetic storage apparatus. This magnetic head is a read/write separate head which combines an electromagnetic inductive head for use in recording which is formed on a magnetic head slider substrate 37 and a magnetoresistive head for use in read-back. The recording magnetic head is an inductive type thin film magnetic head which is comprised of a pair of recording magnetic poles 31, 32, and interlinkage coils 33 disposed therebetween, wherein a thickness of a gap layer between the pair of recording poles is preferably set at approximately 0.3 $\mu$m. Pole 32 (about 1 $\mu$m thick, for example) also serves as a magnetic shield for the read-back magnetic head in combination with a magnetic shield layer 36 (about 1 $\mu$m, for example), and a gap between these shield layers is preferably approximately 0.25 $\mu$m.

The read-back magnetic head is a magnetoresistive head which includes a magnetoresistive sensor 34 and conducting layers 35 serving as electrodes. By way of example, in the drawing of FIG. 3, a gap layer between recording magnetic poles and a shield layer has been omitted.

Figure 4:
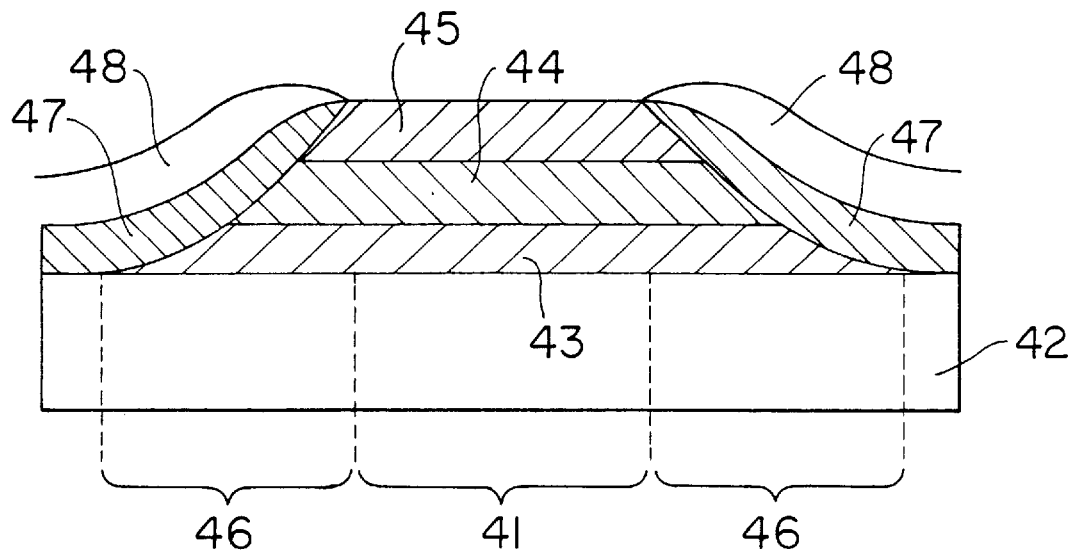
FIG. 4 is a schematic diagram indicating a longitudinal section of a magnetoresistive sensor portion of the magnetic head for use in the magnetic storage apparatus of the present invention.

FIG. 4 shows a longitudinal cross-section of the magnetoresistive sensor 34 of FIG. 3. A signal detection region 41 of the magnetoresistive sensor includes a lateral bias layer 43 formed on a gap layer 42 of aluminum oxide; a separating layer 44 formed on the lateral bias layer 43; and a magnetoresistive ferromagnetic layer 45 formed on the separating layer. The magnetoresistive ferromagnetic layer 45 can be realized by a 20 nm thick NiFe alloy. A 25 nm thick NiFeNb alloy can be used as the lateral bias layer 43, but is not limited thereto, and any ferromagnetic alloy having a relatively high electrical resistance and a good soft magnetic property such as NiFeRh, or the like, can be used as well. Lateral bias layer 43 is magnetized in a lateral direction (perpendicular to the direction of a sense current flowing in magnetoresistive ferromagnetic layer 45) within the plane of layer 43 by a magnetic field induced by the sense current and applies a lateral bias field to magnetoresistive ferromagnetic layer 45. Thereby, the magnetic sensor realized by the present invention can obtain a linear read output from a leakage field of the media. Separation layer 44, which is provided for preventing a shunt current from a sense current in magnetoresistive magnetic layer 45, is preferably made of Ta which has a relatively high electrical resistance, and its film thickness is set at 5 nm.

On both sides of signal detection region 41 are tapered members 46. Tapered member 46 includes a permanent magnet layer 47 provided for turning magnetoresistive magnetic layer 45 into a single magnetic domain, and a pair of electrodes 48 formed thereon for leading out signals. It is important for permanent magnet 47 to have a high coercive force and to not allow its magnetization direction to change easily, hence CoCr or CoCrPt alloy is preferably used.

Figure 5:
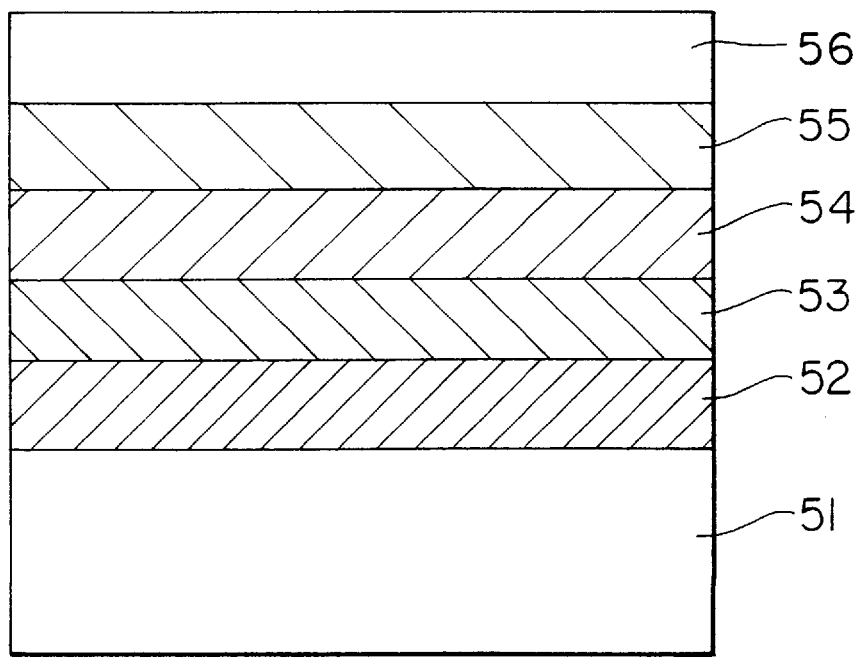
FIG. 5 is a block diagram of a layer structure of a longitudinal magnetic recording media of one embodiment of the invention.

FIG. 5 shows a layer structure of the longitudinal magnetic recording media according to a first embodiment (Embodiment 1) of the present invention. A substrate 51 is provided using an Al—Mg alloy substrate with a major radius of 95 mm$\phi$ and with NiP plating on the surface thereof. As shown in FIG. 5, the following are sequentially formed by a DC magnetron sputtering method: a 10 nm thick Cr-15 at % Ti alloy layer as bcc underlayer 52, a 10 nm thick Co-30 at % Cr alloy layer as hcp underlayer 53, a 14 nm to 22 nm thick Co-22 at % Cr-10 at % Pt alloy as magnetic layer 54, and a 10 nm thick carbon layer as protection layer 55. The conditions for forming the layers are as follows: partial pressure of argon gas at 5 mTorr.; input power at 1 kW; substrate temperature at 300° C. Lubrication layer 56 is provided by diluting a material of perfluoroalkylpolyether with fluorocarbon, and coating it. Further, specimens for comparison are fabricated by directly forming magnetic layer 54 on bcc underlayer 52.

Figure 1A:
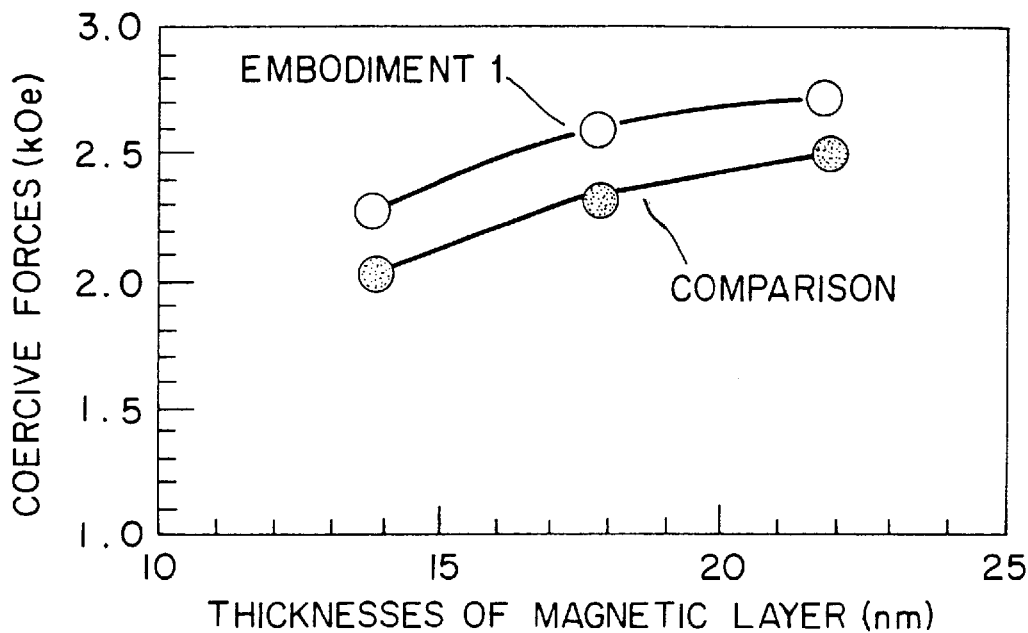
FIGS. 1(*a*) and 1(*b*) respectively illustrate the relationship of coercive force and coercivity squareness versus film thickness of the magnetic layer.
Figure 1B:
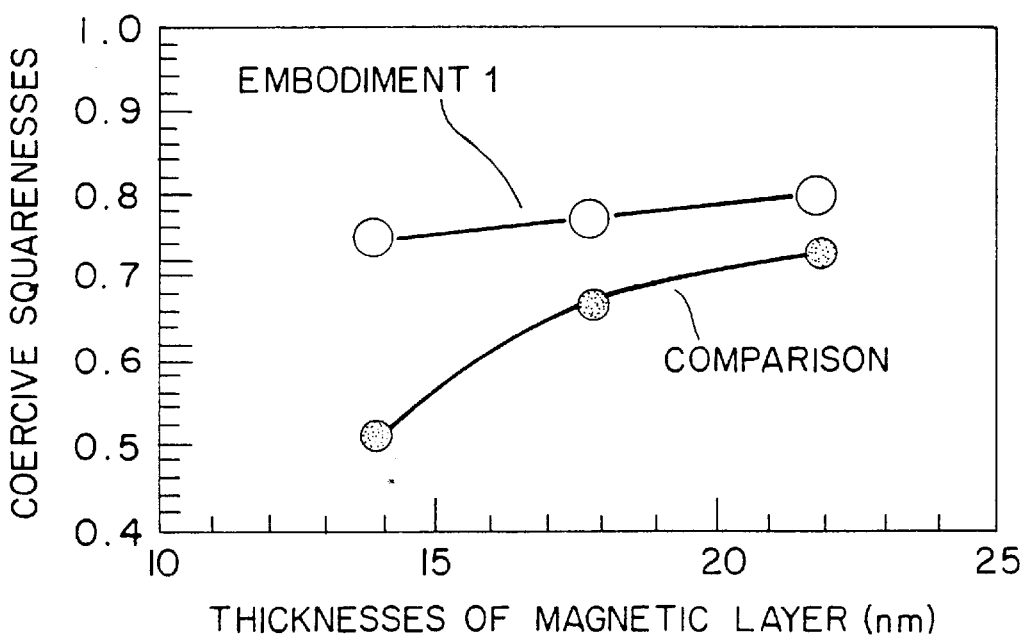

A coercive force and a coercivity squareness which were measured by applying a magnetic field in a relative direction of movement of the magnetic head relative to the recording media at the time of recording versus a thickness of the magnetic layer are shown in FIGS. 1(a) and 1(b), respectively. The longitudinal magnetic recording media according to the embodiment of the invention exhibits a high coercive force compared to the longitudinal magnetic recording media of the comparison example, and can suppress a decrease of the coercivity squareness in a region having a smaller thickness of the magnetic layer. This effect is considered to be due to the fact that since the hcp underlayer has the same crystalline structure as that of the magnetic layer, a crystal structure in part of the magnetic layer which was grown in the initial stage has improved substantially. As described above, it has been found very effective, in order to minimize the deterioration of the magnetic properties resulting from the requirement for a thinner magnetic layer, to provide an hcp underlayer formed between the bcc underlayer and the magnetic layer.

In order to examine the stability of recorded signals, signals are written at a linear recording density of 225 kFCI in the longitudinal magnetic recording media of both the present invention and the comparison example. Then, their changes with time of read-back signals were measured. Here, a film thickness of the magnetic layer was set at 14 nm.

Figure 6:
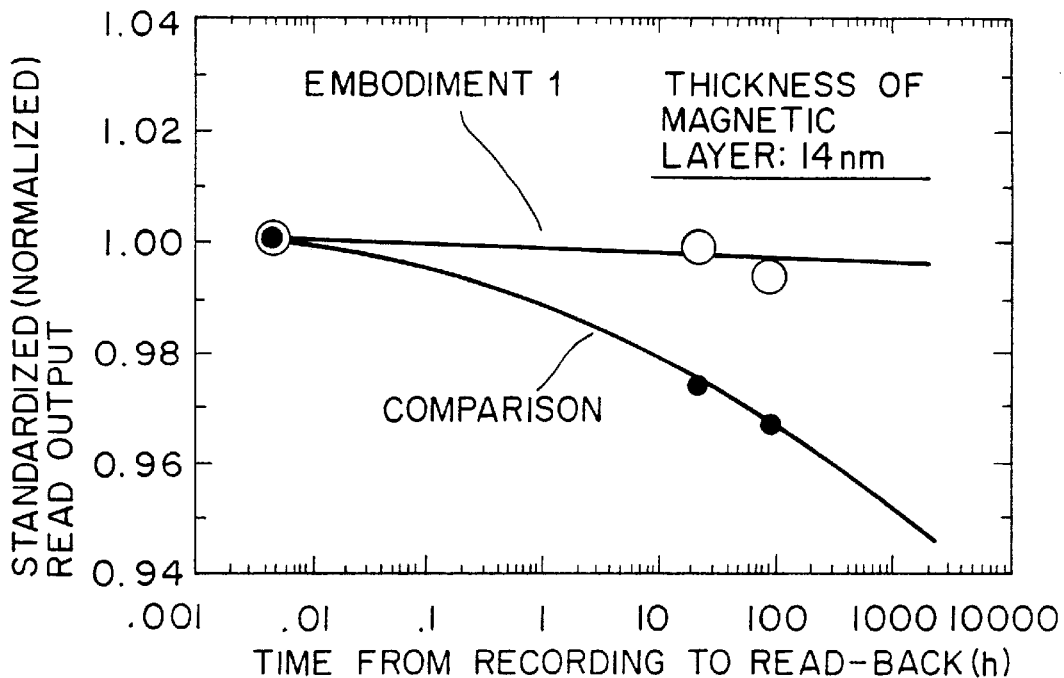
FIG. 6 is a block diagram showing a change of normalized read-back signals with respect to time.

With reference to FIG. 6, in the comparison example its read output decreased gradually with time and it dropped by approximately 3.5% after 100 hours, however, in the longitudinal recording media according to the embodiment of the present invention, even after 100 hours, a drop of its read output was negligible. A main reason for having suppressed the drop of its read output is considered to be due to the provision of the hcp underlayer according to the invention. The growth of crystal grains having excessively small sizes, which renders the magnetic layer more susceptible to the thermal fluctuation, has been suppressed.

The longitudinal magnetic recording media according to this embodiment of the present invention having a magnetic layer which is 18 nm thick, a coercive force of 2.6 kOe, Br×t =70 G $\mu$m, and fluctuation field of 45 Oe was incorporated in a magnetic recording apparatus. The read/write characteristics of the magnetic recording apparatus were evaluated under conditions of a head flying height at 30 nm, a linear recording density at 225 FCI, and a track density at 10 kTPI. As a result of the evaluation, a device S/N ratio of 1.7 was obtained. Furthermore, by applying 8–9 code modulation processing to input signals to the magnetic head, a read/write capability is attained at a recording density of 2 gigabits per square inch bit error rate of 10 bits or fewer per plane after a head seek test of 50,000 cycles traversing from the inner circumference to the outer circumference was obtained and a mean-time-between-failures (MTBF) of 300,000 hours was attained.

Figure 7:
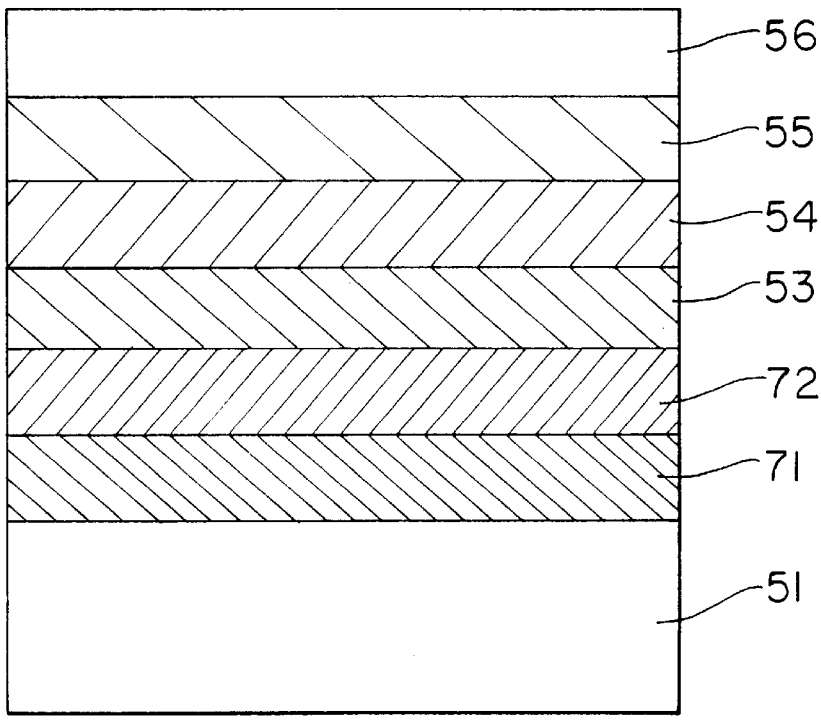
FIG. 7 is a block diagram of a layer structure of a longitudinal magnetic recording media of another embodiment of the present invention.

FIG. 7 illustrates a film structure of a longitudinal magnetic recording media used in a second embodiment (Embodiment 2) of the present invention. For substrate 51, an Al—Mg alloy substrate having a major radius of 95 mm$\phi$ and a NiP plating on the surface thereof is used. The following layers are sequentially formed onto the substrate 51 by a DC magnetron sputtering method: a 10 nm thick Cr layer as a first bcc underlayer 71, a 10 nm thick Cr-15 at % Mo alloy layer as a second bcc underlayer 72, a 10 nm thick Co-30 at % Cr alloy layer as hcp layer 53, a 18 nm thick Co-22 at % Cr-10 at % Pt alloy layer as magnetic layer 54, and a 10 nm thick carbon layer as protection layer 55. Conditions of forming these layers and lubrication layer 56 for this media (hereinafter referred to as media A) were the same as in the embodiment 1 of the invention. Furthermore, for the purpose of comparison, a comparison media having a structure of FIG. 5 and using a 10 nm thick CrMo alloy layer as bcc underlayer 52 was fabricated (hereinafter referred to as media B).

TABLE 1 shows media S/N obtained at a linear recording density of 225 kFCI for the two types of longitudinal magnetic recording media fabricated according to the second embodiment of the invention.

TABLE 1

|  | Film structure of multi-layered underlayer | Media S/N |
| --- | --- | --- |
| Embodiment 1 | CrTi alloy/CoCr alloy | 1.8 |
| Embodiment 2: Media A | Cr/CrMo alloy/CoCr alloy | 1.9 |
| Embodiment 2: Media B | CrMo alloy/CoCr alloy | 1.5 |

For the purpose of comparison, a result of the longitudinal magnetic recording media of embodiment 1 of the invention is also provided. While a large media S/N value of 1.8 was indicated for the media of embodiment 1, a low media S/N value of 1.5 was indicated for media B of embodiment 2. In order to determine the cause of this low value, their crystallographic orientation were examined by the X-ray diffraction method. In the media of embodiment 1, its CrTi alloy layer was found to have (100) orientation, and c-axes of its hcp underlayer and the magnetic layer are found to have longitudinal orientation. However, in media B, (100) orientation was not found in its CrMo alloy layer, thereby deteriorating longitudinal orientation of c-axis of the magnetic layer. On the other hand, in media A of embodiment 2, a high media S/N value as high as that of the media of embodiment 1 was obtained. This is due to the fact that the Cr layer of the first bcc underlayer had a strong (100) orientation, the CrMo layer of the second bcc underlayer is caused also to have a strong (100) orientation during epitaxial growth thereof, and consequently, longitudinal orientation of c-axis in the magnetic layer has been improved. Further, the same effect has been confirmed to be obtainable also by using Cr alloys such as CrTi, CrV, CrMo, CrTa, or the like, as the material of the second bcc underlayer.

A longitudinal magnetic recording media of media A according to the second embodiment of the present invention having a 18 nm thick magnetic layer, a coercive force of 2.9 kOe, Br×t=74 G μm and a fluctuation field of 47 Oe was incorporated in a magnetic storage apparatus having the same structure as that of embodiment 1. The read/write characteristics of this magnetic storage apparatus were evaluated under the conditions of head flying height at 30 nm, a linear recording density at 225 kFCI, and a track density of 10 kTPI. As a result, a device S/N ratio of 1.9 was obtained. Further, by applying 8–9 code modulation processing to an input signal to the magnetic head, a read/write capability at a recording density of 2 gigabits per square inches was attained in the temperature range from 10° C. to 50° C. In addition, the number of bit errors after 50,000 cycles of head seek tests traversing from the inner circumference to the outer circumference is less than 10 bits per plane, and a mean-time-between-failures of 300,000 hours is attained.

Longitudinal magnetic recording media of a third embodiment (Embodiment 3) of the present invention having the same layer structure as that of the first embodiment was fabricated by the DC magnetron sputtering method by sequentially forming the following layers: a 10 nm thick Cr-15 at % Ti alloy as a bcc underlayer 52 on a substrate 51 which is an Al—Mg alloy substrate having a major radius of 95 mm$\Phi$ and NiP plating on the surface thereof; a 10 nm thick CoCrTi alloy layer as a hcp underlayer 53; a 18 nm thick Co-22 at % Cr-10 at % Pt alloy layer as a magnetic layer 54; and a 10 nm thick carbon layer as a protective layer 55. Film forming conditions and lubricating layer 56 are the same as in the first embodiment. Four kinds of compositions were used as the CoCrTi alloy layer which include Co-30 at % Cr-2 at % Ti, Co-30 at % Cr-4 at % Ti, Co-30 at % Cr-6 at % Ti and Co-30 at % Cr-8 at % Ti. Relationships of coercive force or coercivity squareness which were measured by applying a magnetic field in a relative direction of movement of the magnetic head with respect to the recording media at the time of recording versus Ti densities of the hcp underlayer are shown in FIGS. 8(*a*) and 8(*b*), respectively.

Figure 8A:
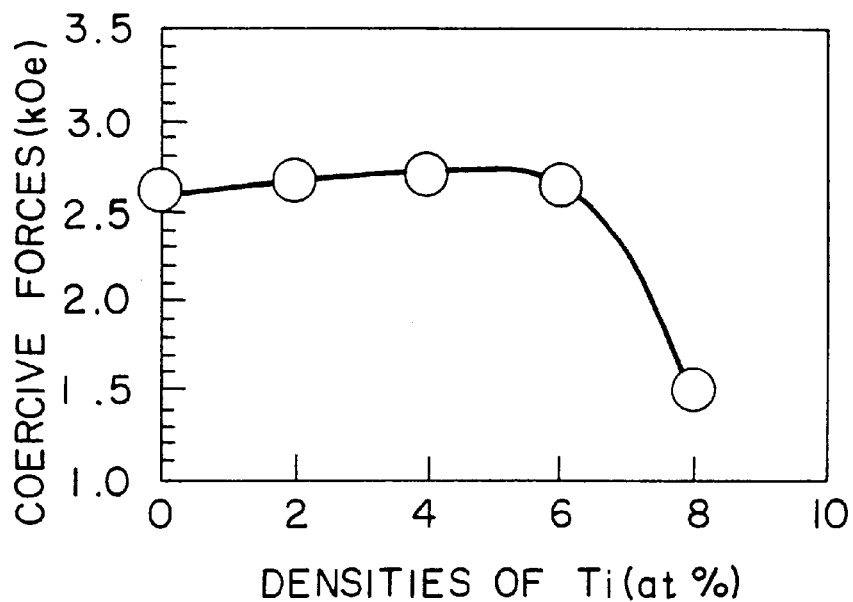
FIGS. 8(*a*) and 8(*b*) respectively illustrate the relationship of coercive force and coercivity squareness with respect to density of Ti.
Figure 8B:
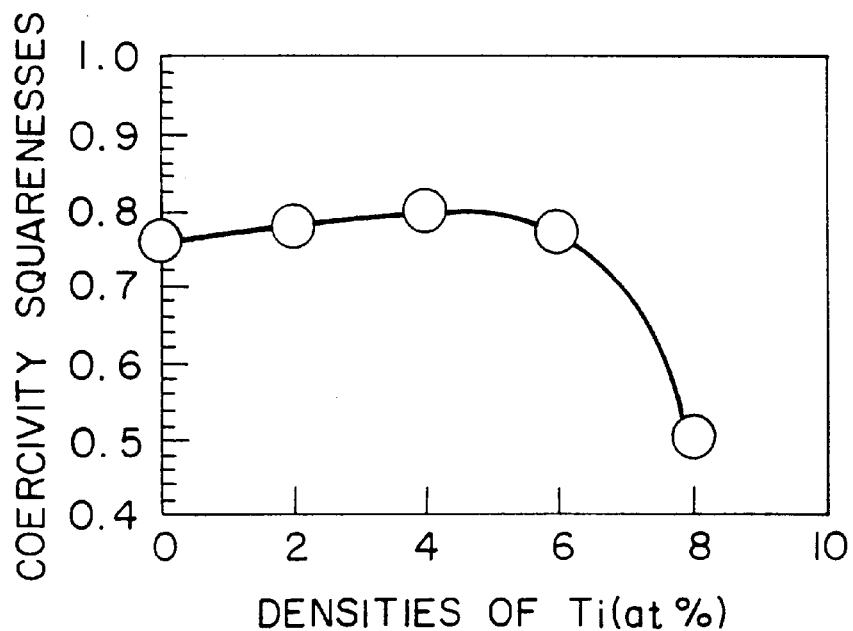

As shown in FIGS. 8(*a*) and 8(*b*), approximately the same values are shown for coercive force and coercivity squareness as with the longitudinal magnetic recording media of the first embodiment, which had no Ti addition, until the Ti density becomes 6 at %. When the Ti density increased to 8 at %, the coercive force and coercivity squareness dropped rapidly. The crystallographic structures were examined by the X-ray diffraction method, and it was found that the c-axis of the magnetic layer had a strong longitudinal orientation until the density of Ti increased to 6 at %, and that when its density increased to 8 at %, the longitudinal orientation of c-axis of the magnetic layer deteriorated substantially. When Mo, W, or Ta was used instead of Ti, the same tendency was observed as above, indicating the same magnetic properties of the longitudinal magnetic recording media of first embodiment up to 4 at % or so irrespective of kinds of additive elements used.

Table 2 shows media S/N ratios at a linear recording density of 225 kFCI of longitudinal magnetic recording media of the third embodiment of the present invention.

TABLE 2

| | Structure of hcp underlayer | Media S/N |
|---|---|---|
| Embodiment 1 | Co-30 at % Cr | 1.8 |
| Embodiment 3 | Co-30 at % Cr-2 at % Ti | 1.9 |
| Embodiment 3 | Co-30 at % Cr-4 at % Ti | 2.0 |
| Embodiment 3 | Co-30 at % Cr-6 at % Ti | 1.9 |
| Embodiment 3 | Co-30 at % Cr-8 at % Ti | 1.2 |

For comparison, the result of the longitudinal magnetic recording media of the first embodiment is also shown. Media of the third embodiment showed equivalent or better media S/N compared to that of the first embodiment until the density of Ti increased to 6 at %. The reason for this is not clearly known. However, it is presumed mainly that magnetization of the hcp underlayer is reduced by addition of Ti, and that the dispersion of grain sizes became smaller. When the density of Ti was increased to 8 at %, its media S/N dropped rapidly, this is because, as described above, the longitudinal orientation of the c-axis deteriorated substantially.

Longitudinal magnetic recording media of embodiment 3 of the invention in which its hcp underlayer has a composition of Co-30 at % Cr-4 at % Ti, its magnetic layer has a 18 nm thick film, its coercive force is 2.7 kOe, Br×t=72 G μm, and its fluctuation field is 46 Oe, was incorporated in a magnetic storage apparatus having the same arrangement as embodiment 1 to evaluate its read/write characteristics under conditions of a head flying height at 30 nm, linear recording density at 225 kFCI, and track density at 10 kTPI. As a result, a device S/N ratio of 1.9 was attained. Further, by applying the 8–9 code modulation processing to input signals to the magnetic head, a read/write capability of 2 gigabits per square inch was obtained in the temperature range from 10° C. to 50° C. Additionally, the number of bit errors after 50,000 cycles of head seek tests traversing from the inner circumference to the outer circumference was less than 10 bits per plane, and a mean-time-between-failures of 300,000 hours was attained.

Figure 9:
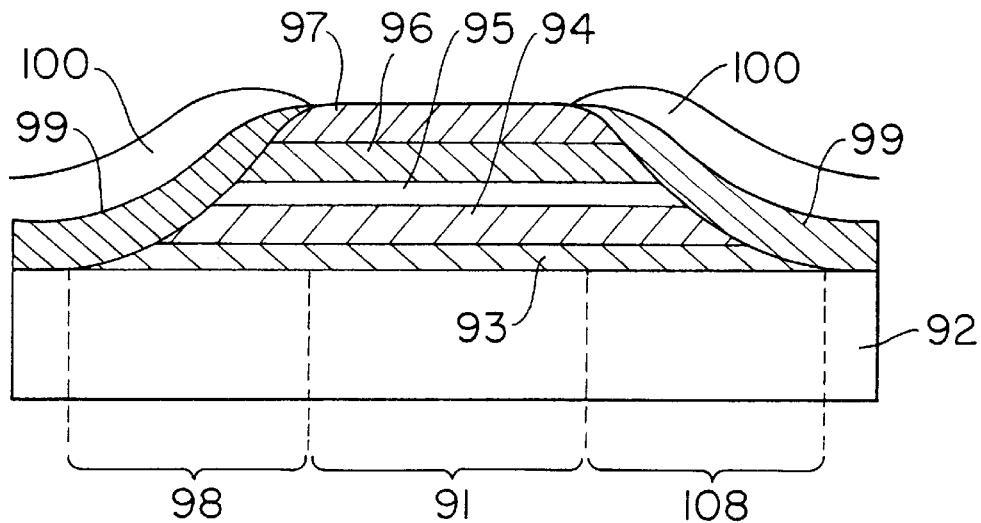
FIG. 9 is a schematic block diagram of a longitudinal section of a spin valve type magnetoresistive sensor portion of the magnetic head for use in the magnetic storage apparatus of the present invention.
Figure 10:
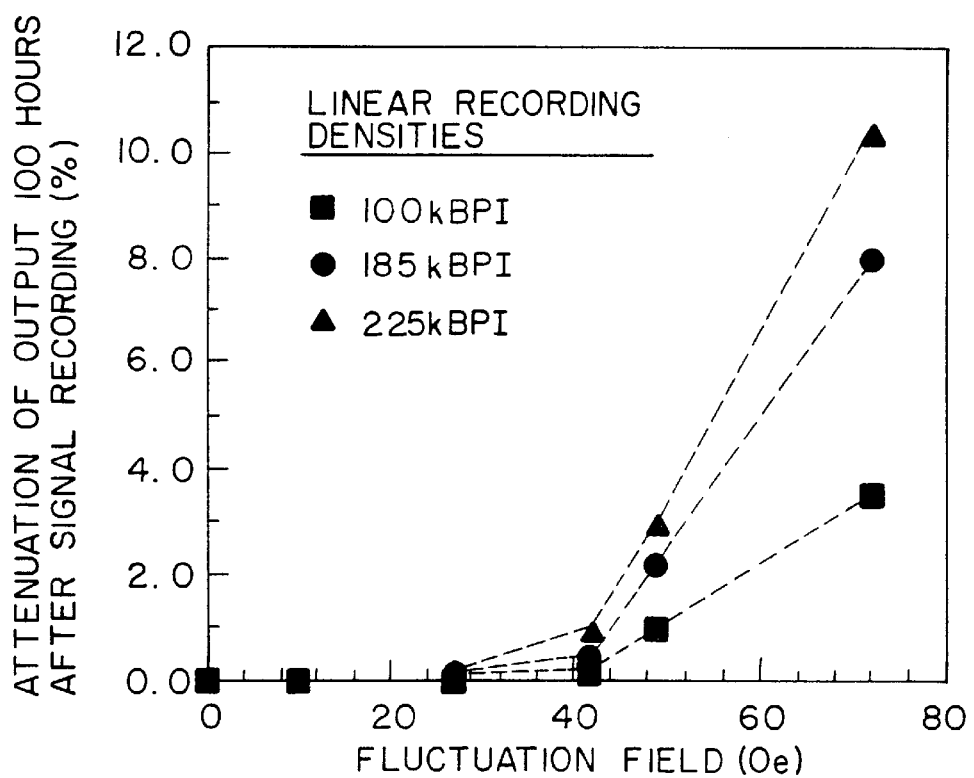
FIG. 10 is a block diagram indicating a relationship between attenuation of read output and fluctuation field.

In any magnetic storage apparatus having the same arrangement as embodiment 1, it is advantageous for its magnetoresistive sensor 24 to use a spin valve type as indicated in FIG. 9 since a greater output can be obtained. A signal detection region 91 of the magnetic sensor has a structure which includes the following sequentially formed layers: a 5 nm thick Ta buffer layer 93 on a gap layer 92 which is aluminum oxide; a 7 nm thick first magnetic layer 94; a 1.5 nm thick Cu intermediate layer 95; a 3 nm thick second magnetic layer 96; and a 10 nm thick Fe-20 at % Mn anti-ferromagnetic alloy layer 97. A Ni-20 at % Fe alloy was used as the first magnetic layer 94, and Co was used as the second magnetic layer 96. By an exchange field from anti-ferromagnetic alloy layer 97, magnetization of the second magnetic layer 96 is fixed in one direction. In contrast, a direction of magnetization in the first magnetic layer 94 which is disposed adjacent to the second magnetic layer via non-magnetic intermediate layer 95 is caused to change by a leakage flux from the longitudinal magnetic recording media. As a result of a relative change of magnetization directions in these two magnetic layers, an overall change in resistance for these three layers occurs. This phenomenon is called spin valve effect. In this embodiment of the invention, a spin valve type magnetic head utilizing this effect is applied to its magnetoresistive sensor. By way of example, tapered portion 98 including permanent magnet layer 99 and electrode 100 is the same as the magnetoresistive sensor of FIG. 4.

As a longitudinal magnetic recording media, a media having a magnetic layer the thickness of which is 14 nm, a coercive force of 2.3 kOe, Br×t=60 G μm, and a fluctuation field of 62 Oe was incorporated in the magnetic storage apparatus described in embodiment 1 so as to evaluate its read/write characteristics under the conditions of a head flying height at 30 nm, linear recording density at 260 kFCI, and track density at 13 kTPI. As a result, a device S/N of 2.0 was obtained. Further, by applying the 8–9 code modulation processing to input signals to the magnetic head, a read/write capability at a recording density of 3 gigabits per square inches was attained in the temperature range from 10° C. to 50° C. In addition, the number of bit errors less than 10 bits per plane after 50,000 cycles of head seek tests traversing from the inner circumference to the outer circumference was obtained, and a mean-time-between-failures of 300,000 hours was attained.

The longitudinal magnetic recording media according to the present invention has such advantages that since growth of extremely fine magnetic crystal grains can be suppressed and since the dispersion of grain sizes can be minimized, a substantially low media noise is attained, and the influence of the thermal fluctuation can be suppressed to a minimum. Furthermore, by combining the longitudinal magnetic recording media and the magnetoresistive head according to the present invention, a magnetic storage apparatus which is highly reliable and has a recording density of 2 gigabits or more per square inch can be realized.

What is claimed is:

1. An apparatus comprising:
    a reco rding medium; and
    a read/write head which reads/writes information from/to the recording medium,
    wherein the recording medium has a magnetic layer formed above an underlayer in such a manner that an attenuation value of signals that have been recorded at a linear recording density of 225 kBPI is not greater than 2% after 100 hours, and
    wherein a fluctuation field of a magnetic viscosity is at least 45 Oe at 25° C. in a magnetic field having a strength equal to a remanence coercivity or coercive force.

2. The apparatus according to claim 1, wherein the read/write head includes an inductive writing portion and a magnetoresistive reading portion.

3. The apparatus according to claim 1, wherein the magnetic layer and the underlayer are formed from material having a hexagonal close-packed (hcp) structure.

4. The apparatus according to claim 3, further comprising another underlayer beneath the underlayer having the hcp structure, said another underlayer having a body-centered cubic (bcc) configuration.

5. The apparatus according to claim 4, wherein said underlayer does not serve as a recording layer and is formed from a material comprising Co and Cr as main components.

6. The apparatus according to claim 5, wherein said underlayer further includes an additive selected from a group consisting of Mo, Ta, Ti and W, and the thickness of said underlayer is approximately 5–20 nm.

7. The apparatus according to claim 6, wherein said another underlayer is formed from a material comprising Cr.

8. The apparatus according to claim 3, wherein the magnetic layer and the underlayer, having the hcp structure, have crystal grains a majority of which have c-axes that are substantially parallel to a plane defined by the recording medium.

9. A longitudinal magnetic recording medium comprising a magnetic layer of a hexagonal close-packed configuration whose crystal grains have a c-axis parallel to a surface plane of said magnetic layer, the magnetic layer being formed on an underlayer of a hexagonal close-packed configuration having no substantial magnetization whose crystal grains have a c-axis parallel to a surface plane of said underlayer.

10. The longitudinal magnetic recording medium according to claim 9, wherein said magnetic layer having a fluctuation field of a magnetic viscosity at 25° C. of at least 40 Oe in a magnetic field having a strength equal to a remanence coercivity or coercive force thereof.

11. The longitudinal magnetic recording medium according to claim 9, wherein a product of a thickness and a saturated flux density of the underlayer is less than 20% of a product of a thickness and a saturated flux density of said magnetic layer and said magnetic layer having a value of fluctuation field of a magnetic viscosity at 25° C. of at least 45 Oe in a magnetic field having a strength equal to a remanence coercivity or coercive force thereof.

12. A longitudinal magnetic recording medium comprising a Co alloy magnetic layer of a hexagonal close-packed configuration whose crystal grains have a c-axis parallel to a surface plane of said magnetic layer, the magnetic layer being formed on an underlayer of a hexagonal close-packed configuration Co-Cr alloy containing Cr of 26–50 at % whose crystal grains have a c-axis parallel to a surface plane of said underlayer.

13. The longitudinal magnetic recording medium according to claim 12, wherein said underlayer further includes an additive selected from a group consisting of Mo, Ta, Ti and W.

14. The longitudinal magnetic recording medium according to claim 13, wherein said underlayer is 5–20 nm thick.

15. A longitudinal magnetic recording medium comprising a substrate, a first underlayer of a body-centered cubic configuration Cr alloy formed on the substrate, a second underlayer of hexagonal close-packed configuration Co-Cr alloy containing Cr of 26–50 at % whose grains have a c-axis parallel to a surface of said second layer formed on the first underlayer, and a Co alloy magnetic layer of a hexagonal close-packed configuration whose grains have a c-axis parallel to a surface plane of said magnetic layer formed on the second underlayer.

16. The longitudinal magnetic recording medium according to claim 15, wherein said underlayer further includes an additive selected from a group consisting of Mo, Ta, Ti and W.

17. The longitudinal magnetic recording medium according to claim 16, wherein said second underlayer is 5–20 nm thick.

18. A longitudinal magnetic recording medium comprising a substrate, a first underlayer of a body-centered cubic configuration on the substrate, a second underlayer of a body-centered cubic configuration formed on the first underlayer, a third underlayer of a hexagonal closed-packed configuration having no substantial magnetization whose crystal grains have a c-axis parallel to a surface plane of said substrate formed on the second underlayer, and a Co alloy magnetic layer of a hexagonal closed-packed configuration formed on the third underlayer with a fluctuation field of a magnetic viscosity at 25° C. of at least 40 Oe in a magnetic field having a strength equal to a remanence coercivity or coercive force thereof, wherein the magnetic layer has grains which have a c-axis parallel to the surface plane of said substrate.

19. The longitudinal magnetic recording medium according to claim 18, wherein said magnetic layer has a fluctuation field of a magnetic viscosity at 25° C. of at least 40 Oe in a magnetic field having a strength equal to a remanence coercivity or coercive force thereof.

20. The longitudinal magnetic recording medium according to claim 18, wherein a product of a thickness and a saturated flux density of the third underlayer is less than 20% of a product of a thickness and a saturated flux density of the magnetic layer and said magnetic layer has a fluctuation field of a magnetic viscosity at 25° C. of at least 45 Oe in a magnetic field having a strength equal to a remanence coercivity or coercive force thereof.

21. The longitudinal magnetic recording medium according to claim 20, wherein said third underlayer is a Co-Cr alloy containing Cr of 26–50 at %.

22. The longitudinal magnetic recording medium according to claim 22, wherein said third underlayer further includes an additive selected from a group consisting of Mo, Ta, Ti and W.

23. The longitudinal magnetic recording medium according to claim 22, wherein said third underlayer is 5–20 nm thick.

24. A longitudinal magnetic recording medium comprising a substrate, a first underlayer of Cr formed on the substrate, a second underlayer of Cr alloy formed on the first underlayer, a third underlayer of Co-Cr alloy containing Cr at 26–50 at % whose grains have a c-axis parallel to a surface plane of said substrate formed on the second underlayer, and a Co alloy magnetic layer of a hexagonal close-packed configuration whose grains have a c-axis parallel to the surface plane of said substrate formed on the third underlayer.

25. The longitudinal magnetic recording medium according to claim 24, wherein said third underlayer further includes an additive selected from a group consisting of Mo, Ta, Ti and W.

26. The longitudinal magnetic recording medium according to claim 25, wherein said third underlayer is 5–20 nm thick.

27. A magnetic recording and/or writing apparatus comprising a read and/or write magnetic head which reads and/or writes information from a recording medium defined by claim 9, and a driving means for rotating said recording medium.

* * * * *